June 11, 1940.  H. BRUNSWIG  2,204,174
DIRECTION FINDING SYSTEM
Filed March 3, 1938
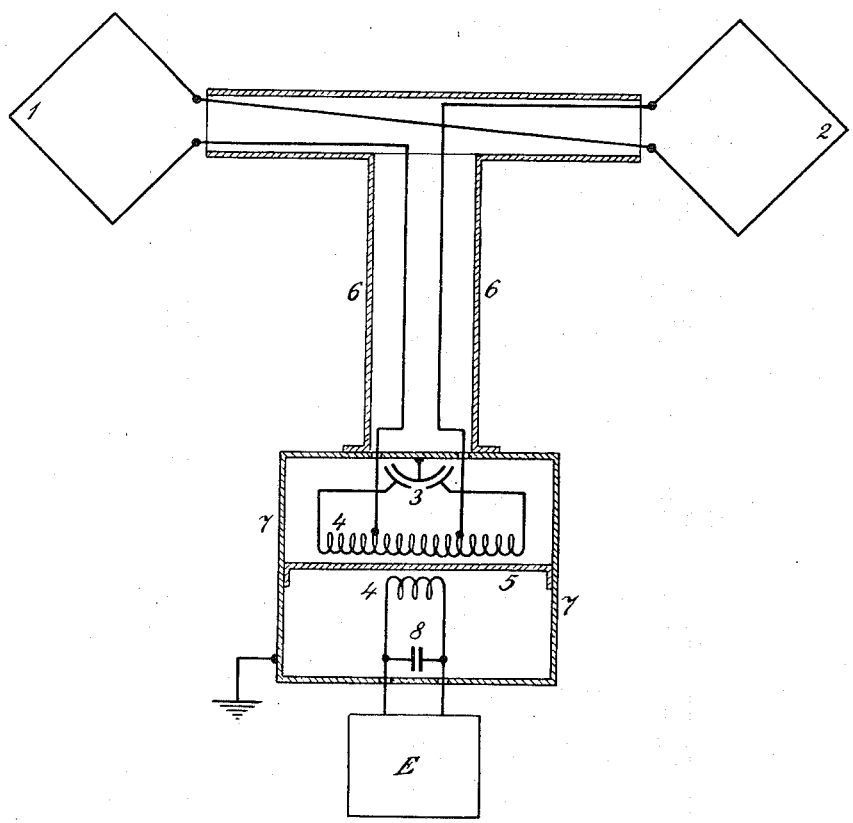
Inventor:
Heinrich Brunswig
by R. C. Hopgood
Attorney Patented June 11, 1940

2,204,174

UNITED STATES PATENT OFFICE 2,204,174

DIRECTION FINDING SYSTEM

Heinrich Brunswig, Berlin, Germany, assignor to C. Lorenz Aktiengesellschaft, Berlin-Tempelhof, Lorenzweg, Germany, a company Application March 3, 1938, Serial No. 193,638
In Germany March 4, 1937

3 Claims. (Cl. 250—11)

The present invention relates to direction finding systems and has for its object to provide direction finding which is independent of the night effect.

The employment of two-frame arrangements in order to avoid direction finding errors caused by the night effect is a well known expedient. The two individual frames thus used are mounted on a base common thereto and so interconnected in electrical opposition as to compensate falsely polarized waves incident in the minimum position. The directional effect is produced by the difference between the transit times which occurs on reception with the two individual frames, and this difference is zero when the base common to the frames is at right angles to the direction toward the transmitter. The position of the transmitter in question is thus determined by the minimum value of reception volume.

The difficulties which arise in connection with the aforesaid double-frame arrangement are manifold. It is ncessary that both individual frames have the same electrical value in order to secure accurate and reliable compensation with respect to the interference voltages. Means must be provided for eliminating the pick-up tendency of the lead-in conductors to the frames. The first mentioned expedient has particularly for its object to eliminate the disturbing effect of high antennae. A symmetric circuit arrangement has been proposed for this purpose in connection with single-frame devices, according to which the frame is shunted by a differential condenser having its central plate or vane connected to earth. The disturbing high antenna effect is then compensated by balancing the two halves of the frame to the same electrical value. Attempts have been made to apply this method to double-frame arrangements by providing each individual frame with a differential condenser and balancing both frames in a disconnected condition to the state of symmetry. However, investigations have proven that no ideal direction finding diagrams with sharply defined minima are attained with double-frame devices balanced in the above mentioned manner. On the contrary, only one single minimum is obtained, whereas the other becomes indistinct. Hence, an unilateral diagram is set up and, moreover, it has been found that one of the minima gives rise to direction finding errors.

Difficulties of this kind are avoided by the present invention, one embodiment of which is shown in the accompanying drawing, the single figure of the drawing showing a wiring diagram according to the invention.

The main feature of the invention consists in that the individual frames of a double-frame arrangement are interconnected in one circuit and balanced as a whole in order to obtain symmetry.

In the drawing, the single figure of which illustrates an embodiment of the present invention, 1 and 2 designate two individual frames interconnected in electrical opposition in one circuit and constructed as like one another as possible. The symmetrical balance for the purpose of eliminating the high antenna effect is accomplished for both frames by the differential condenser 3, the outer plates being connected, respectively, to said frames and the central plate of which is connected to ground. The double-frame arrangement is matched to the input circuit of the receiving equipment E through a transformer 4 having its windings statically shielded in any known manner by metallic screen 5. In order to eliminate the pick-up effect of the leads to the frames and of the transformer windings, these elements are shielded by the shielding tube 6 and the shielding casing 7 both maintained at earth potential. The double-frame arrangement is tuned by a condenser 8 across the input circuit of the direction finding receiving equipment.

The direction finding diagram of the above described double-frame arrangement according to the invention actually obtained by tests exactly corresponds to the diagram theoretically expected. This diagram possesses two sharply defined minima which determine without aberration the direction in which the transmitter is positioned.

What is claimed is:

1. A direction finding system comprising two spaced frame aerials in substantially the same horizontal plane, a pair of substantially horizontal conductors interconnecting said frame aerials in electric opposition, a direction finding receiver having an input circuit, additional conductors connecting said input circuit to one of said horizontal conductors at substantially the mid-point thereof to form a series circuit including said additional conductors, said horizontal conductors and said frame aerials, and means connected to said additional conductors for symmetrically balancing with respect to earth said frame aerials as a whole.

2. A direction finding system comprising two spaced frame aerials in substantially the same horizontal plane, a pair of substantially horizontal conductors interconnecting said frame aerials in electric opposition, a direction finding receiver having an input circuit, additional conductors connecting said input circuit to one of said horizontal conductors at substantially the mid-point thereof to form a series circuit including said additional conductors, said horizontal conductors and said frame aerials, and a differential condenser for symmetrically balancing with respect to earth said frame aerials as a whole, said condenser having two plates connected to said additional conductors and a central grounded plate.

3. A direction finding system comprising two spaced frame aerials in substantially the same horizontal plane, a pair of substantially horizontal conductors interconnecting said frame aerials in electric opposition, a direction finding receiver having an input circuit, vertical conductors connected to one of said horizontal conductors at substantially the mid-point thereof to form a series circuit including said additional conductors, said horizontal conductors and said frame aerials, a matching transformer coupling said vertical conductors with said input circuit, means for statistically shielding said transformer, means for shielding said vertical conductors, and means connected with said vertical conductors for symmetrically balancing with respect to earth said frame aerials as a whole.

HEINRICH BRUNSWIG.